United States Patent [19]

Alimpich et al.

[11] Patent Number: 6,111,579

[45] Date of Patent: Aug. 29, 2000

[54] DATA PROCESSOR CONTROLLED DISPLAY SYSTEM WITH A TREE HIERARCHY OF ELEMENTS VIEW HAVING VIRTUAL NODES

[75] Inventors: Claudia Alimpich; Benjamin Nelson Jeffcoat, both of Boulder; Deborah Elizabeth Neuhard; Luana Linda Vigil, both of Longmont; James Philip John Wittig, Boulder, all of Colo.

[73] Assignee: International Business Machines Corporation, Armonk, N.Y.

[21] Appl. No.: 09/053,213

[22] Filed: Mar. 31, 1998

[51] Int. Cl.[7] ........................................................ G06F 3/00
[52] U.S. Cl. .......................... 345/356; 345/353; 345/357; 345/967; 707/104; 707/514
[58] Field of Search ..................... 345/335, 353, 345/356, 357, 967, 968; 707/513, 514, 515, 104

[56] References Cited

U.S. PATENT DOCUMENTS

| | | | |
|---|---|---|---|
| 5,504,853 | 4/1996 | Schuur et al. | 709/360 |
| 5,551,037 | 8/1996 | Fowler et al. | 709/300 |
| 5,644,740 | 7/1997 | Kiuchi | 709/557 |
| 5,701,137 | 12/1997 | Kiernan et al. | 345/119 |
| 5,751,962 | 5/1998 | Fanshier et al. | 709/223 |
| 5,801,702 | 9/1998 | Dolan et al. | 345/357 |
| 5,825,361 | 10/1998 | Rubin et al. | 345/349 |
| 5,905,498 | 5/1999 | Diament | 345/356 |

Primary Examiner—Raymond J. Bayerl
Assistant Examiner—Cuong T. Thal
Attorney, Agent, or Firm—Julius B. Kraft; David W. Victor; Konrad Raynes & Victor LLP

[57] ABSTRACT

A data processing controlled display system for the interactive display and control of a hierarchical tree of objects. The tree comprises a plurality of selectable objects arranged in a hierarchy, each of said objects being associated with a data entity and at least one of said objects having a plurality of virtual child objects, each of said virtual child objects being without an associated data entity.

33 Claims, 7 Drawing Sheets

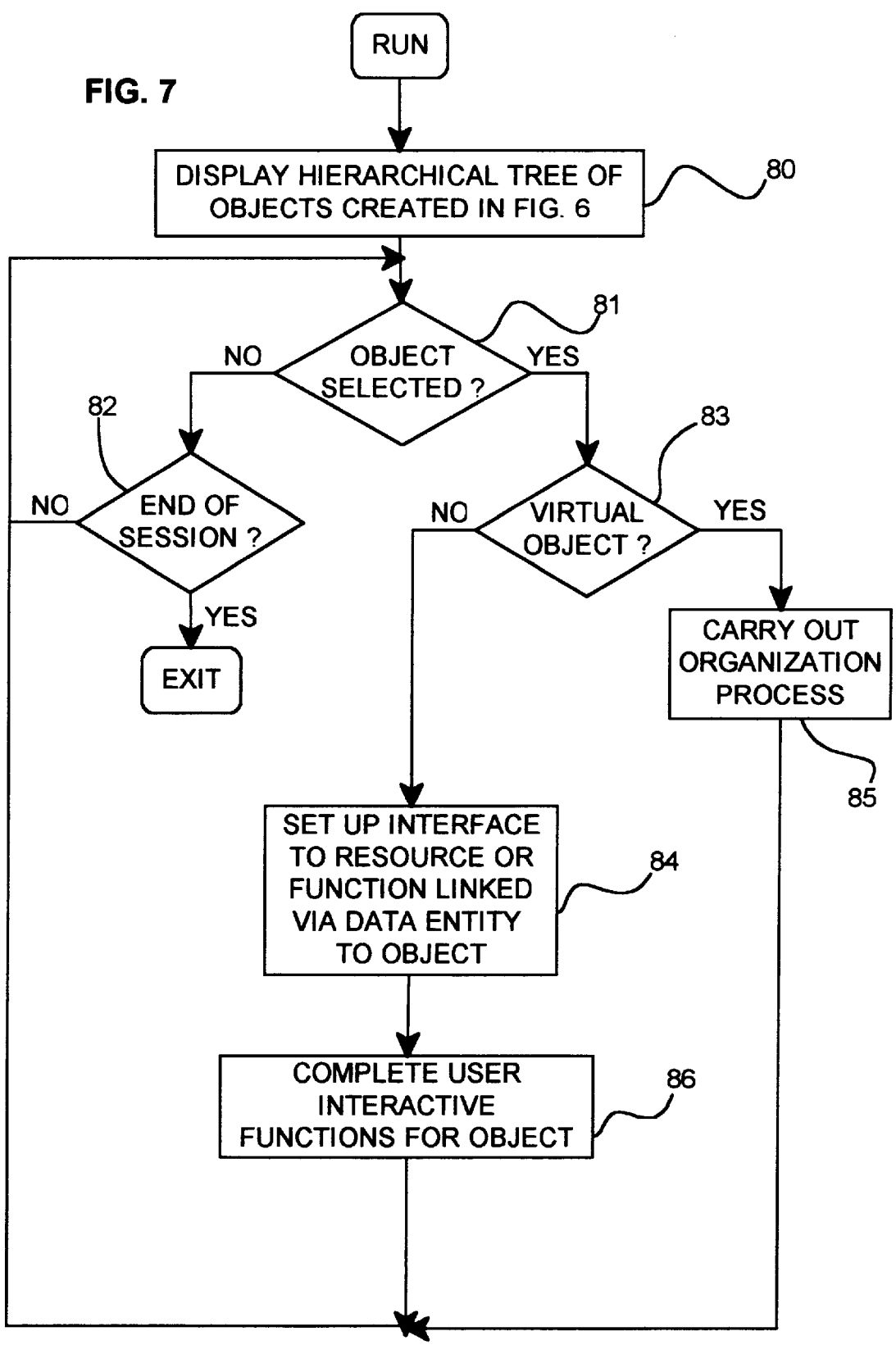

DATA PROCESSOR CONTROLLED DISPLAY SYSTEM WITH A TREE HIERARCHY OF ELEMENTS VIEW HAVING VIRTUAL NODES

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Selectable Basic Function Interfaces for the Control of Varying Types of Customer Requirements and With Additional Customized Functions", U.S. Ser. No. 09/053,210; "Data Processor Controlled Display System With a Plurality of Switchable Customized Basic Function Interfaces for the Control of Varying Types of Operations", U.S. Ser. No. 09/053,214; "Data Processor Controlled Display System for the Control of Operations With Control Properties Which are Selectably Constant or Variable", U.S. Ser. No. 09/053,207; "Data Processor Controlled Display Interface With Tree Hierarchy of Elements View Expandable into Multiple Detailed Views", U.S. Ser. No. 09/053,209; "Data Processor Controlled Interface with Multiple Tree of Elements Views Expandable into Individual Detail Views", U.S. Ser. No. 09/052,858; and "Data Processor Controlled Display With a Tree of Items With Modification of Child Item Properties Designated at Parent Level Without Modification of Parent Item Properties", U.S. Ser. No. 09/053,211; all are assigned to International Business Machines Corporation by Claudia Alimpich et al. and all are filed concurrently herewith.

TECHNICAL FIELD

The present invention relates to user-friendly interactive computer supported display technology and particularly to such user interactive systems and programs which have user interactive interfaces with trees of elements or objects.

BACKGROUND OF THE INVENTION

The computer and computer related industries have benefitted from a rapidly increasing availability of data processing functions. Along with this benefit comes the problem of how to present the great number and variety of available functions to the interactive operator or user in display interfaces which are relatively easy to use. In recent years, the hierarchical tree has been a widely used expedient for helping the user to keep track of and organize the operative and available functions. In typical tree structures such as those in Microsoft Windows 95™ and IBM Lotus™ systems, there is presented on the display screen a variety of available functions and resources in tree hierarchies with classes and subclasses of functions and resources displayed as objects in a descending and widening order based upon some kind of derivation from the next higher class or subclass.

The basic framework of the conventional display interface tree organization is usually provided by the programmed operating system. It is based upon descending operating levels in the tree. Each level has a number of parallel nodes, usually increasing in number as the tree descends. Each node has associated therewith an element or object which represents a data entity in the system for providing a corresponding resource or function when the interactive user selects the particular element or object. While conventional tree hierarchy interfaces have been very effective in providing an organized user interface to complex computer systems resources and functions, such trees have the limitation that they can not readily provide user interfaces to processes involving objects in the tree in operations which are not related to the tree hierarchy. In other words, it is difficult to modify the basic tree organization so as to permit the user to interactively perform ancillary functions which are not part of the tree hierarchy. The present invention is directed to this limitation in tree interfaces.

It should be noted that the tree hierarchal structure is one of the primary organizational expedients in the object oriented programming processes which have become more prevalent over the past decade. In object oriented programming it is not unusual to have very elaborate and extensive hierarchical relationships displayed in tree views. While object oriented programming systems provide their users with a great amount of flexibility in formatting the actual objects, their users are much more limited in varying the format or structure of the tree hierarchy itself.

SUMMARY OF THE INVENTION

The present invention relates to a data processor controlled display system providing an ease of use interface based upon a tree view of elements. The key to the present invention is that it provides the designer of program interfaces with the capability of creating virtual elements or objects within a tree hierarchy of existing elements or objects in a display interface. In the conventional hierarchy, the existing elements are each associated with a data entity in the operating computer for performing a particular function or providing a particular resource. The virtual element does not have such an associated data entity or represent a physical entity such as a printer or printer job. However, it is insertable into the tree hierarchy so that it has parent elements and child elements in the tree, and such parent and child elements are usually existing elements which do have associated data entities. Thus, the virtual element is an organizational tool which aids the user to interact with real or existing tree elements to perform functions outside of those carried out by the computer system represented by the tree.

In its broadest aspects, the present invention covers a data processor controlled display system providing an interface based upon a tree view of selectable elements. The tree has a plurality of selectable elements arranged in a hierarchy, each of said elements being associated with a data entity or representing a physical entity, and at least one virtual element without an associated data entity. The virtual element or object usually has child objects respectively associated with data entities. The type or class of the virtual object is likely to be based upon properties of the virtual object which are nonhierarchical, i.e. the properties are not related to hierarchy functions.

As will be seen hereinafter in greater detail, the present invention may be advantageously used in the control of production operations such as high throughput printing operations.

BRIEF DESCRIPTION OF THE DRAWINGS

FIG. 7 is a flowchart showing the running of the program described with respect to FIG. 6.

DETAILED DESCRIPTION OF THE PREFERRED EMBODIMENT

Figure 1:
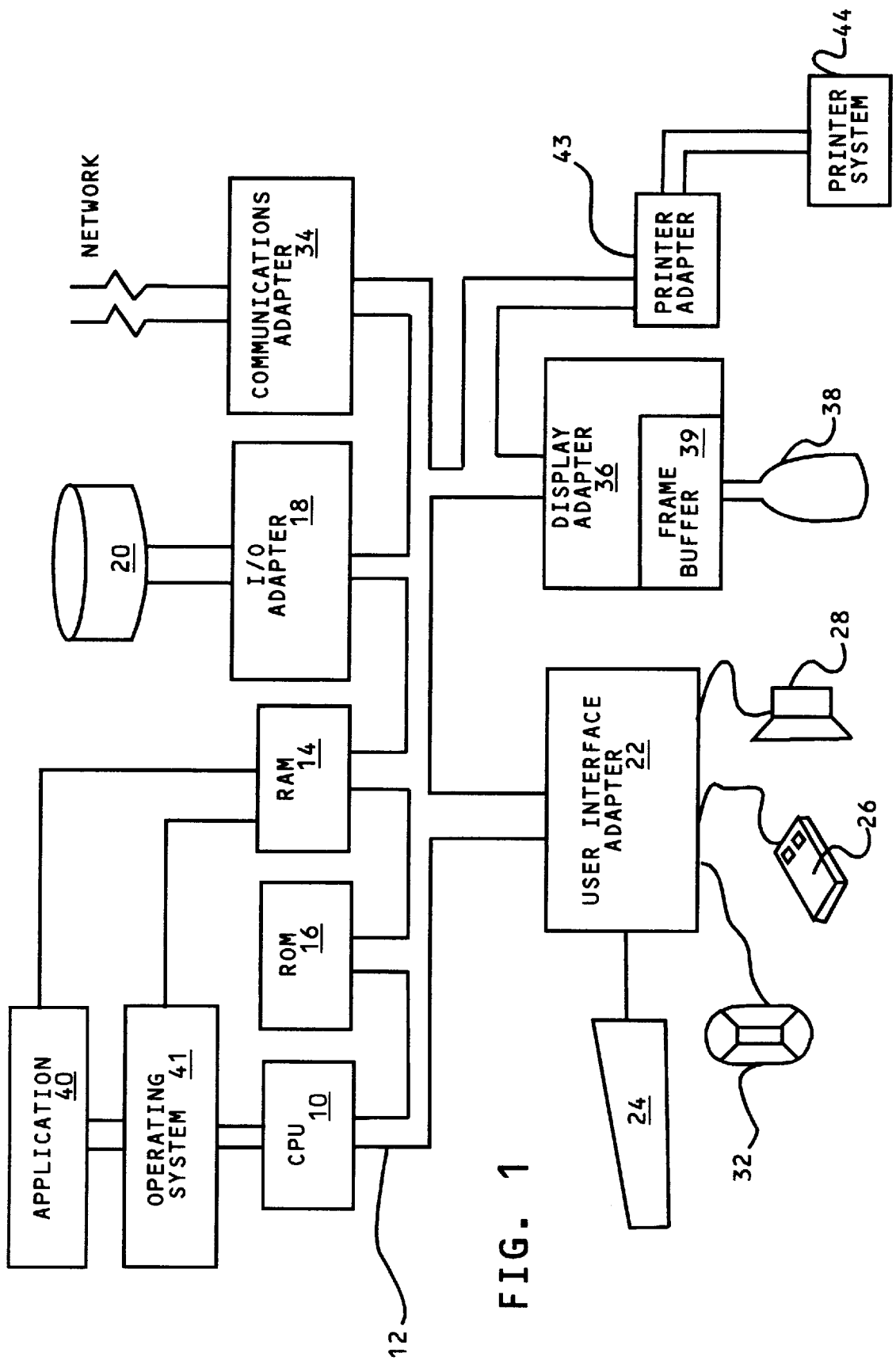
FIG. 1 is a block diagram of an interactive data processor controlled display system including a central processing unit which is capable of implementing the program of the present invention for presenting object tree views.

Referring to FIG. 1, a typical data processing system is shown which may function as the computer controlled display terminal used in implementing the tree views of the present invention. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation); Microsoft Windows 95™ or Windows NT™, as well as Unix and AIX operating systems. A programming application for presenting hierarchical tree views and for modifying tree views to include virtual objects in accordance with the present invention, application 40 to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14 which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems of which objects may also be displayed in the object tree interfaces of the present invention. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the illustrative embodiment, which will be subsequently described, the hierarchical trees of objects and the subsequent modified tree views to include virtual objects will be shown with respect to the control of high throughput printers such as electrophotographic or laser printers. A local printer system 44 may be accessed and controlled via printer adapter 43 while, as previously mentioned, networked printers may communicate via communications adapter 34.

There will now be described a simple illustration of the present invention with respect to the display screens of FIGS. 2 through 5. When the screen images are described, it will be understood that these may be rendered by storing an image and text creation programs, such as those in any conventional window operating system, in the RAM 14 of the system of FIG. 1. The operating system is diagrammatically shown in FIG. 1 as operating system 41. The display screens of FIGS. 2 through 5 are presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 2:
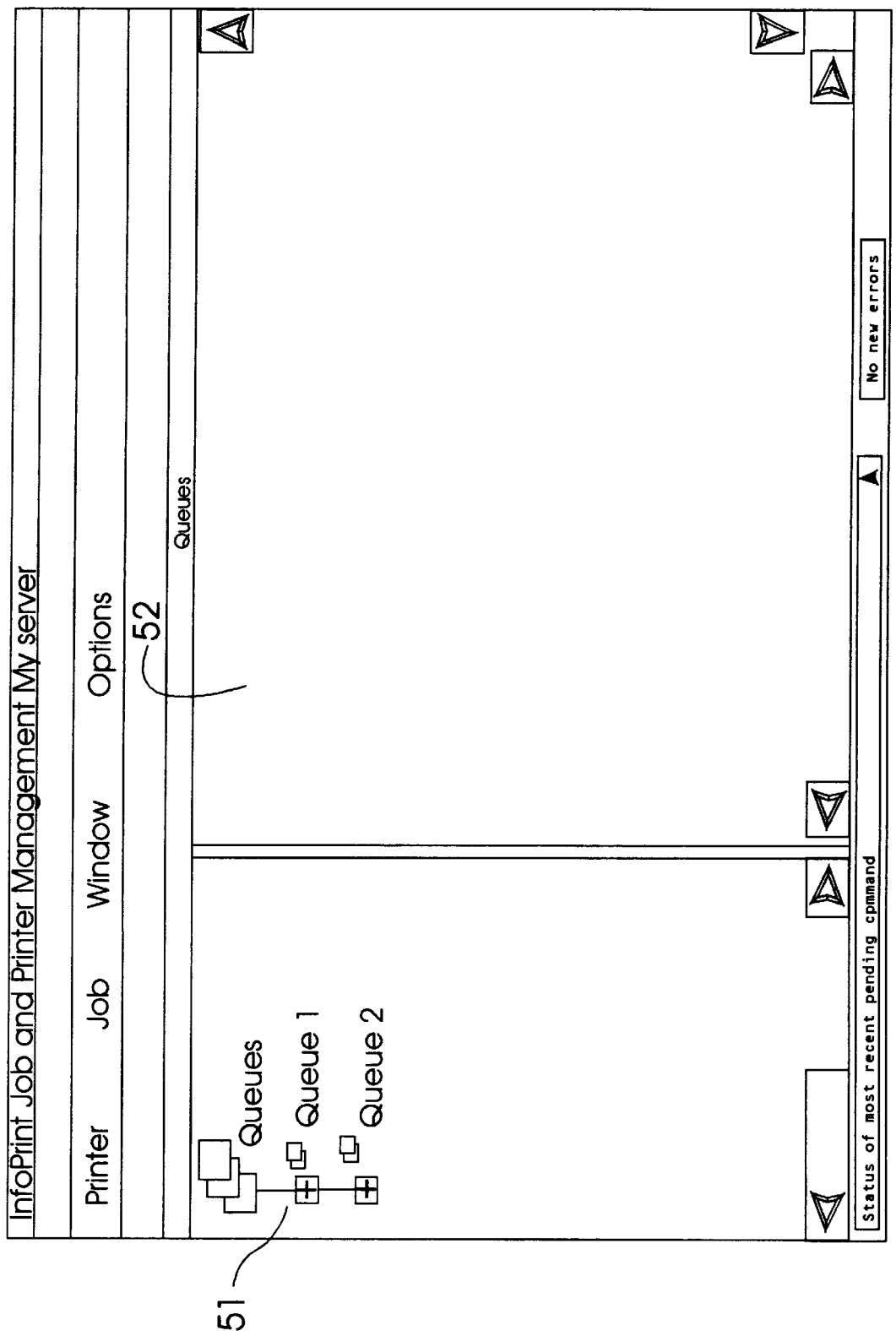
FIG. 2 is a diagrammatic view of a portion of a display screen on which a portion of a hierarchical object tree of queue objects is shown prior to any user selection.
Figure 3:
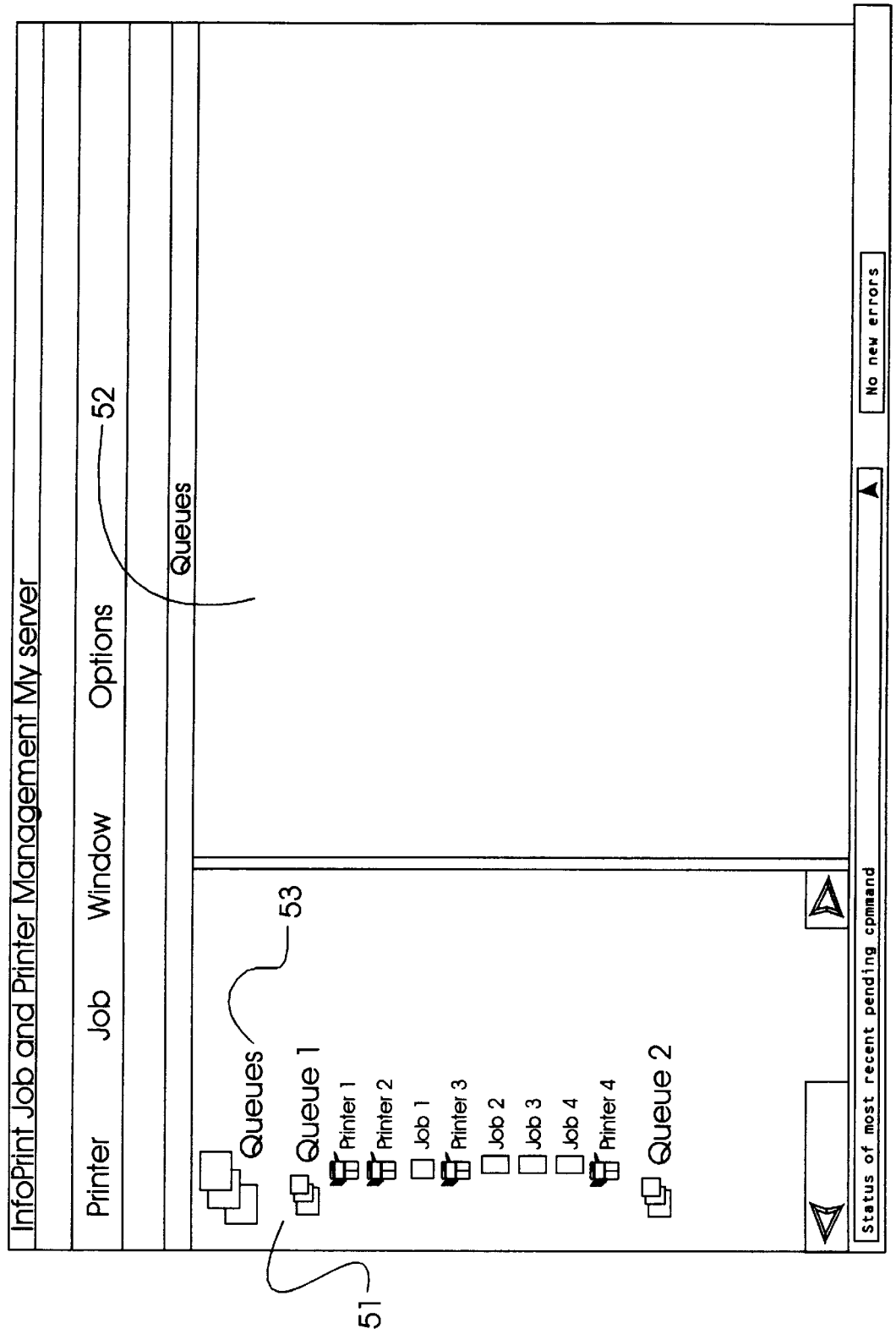
FIG. 3 is the view of the display screen of FIG. 2 showing the conventional view of child objects resulting from the selection of an object from the tree of queue objects of FIG. 2.

The display screen of FIG. 2 shows a portion of a hierarchical tree 51 which represents a hierarchy of queues in a printer control system. The "Queues" object is a virtual object in that it is not associated with any data entity in the printer system. It only has an organizational purpose in that the "Queue1" and "Queue2" objects may be organized as children of it in the tree. Queue1 and Queue2 are respectively associated with data entities respectively representative of two queues in the system. Thus, Queue1 and Queue2 are real objects in that they represent functions and resources in the printer control system. Further information about the attributes of any of these queue objects may be interactively obtained by the user by selecting the particular queue for a detail view. In response to such a selection, the attribute details will be shown in a conventional manner in region 52 of the screen. In conventional systems, either Queue1 or Queue2 may be interactively selected by the user (by pointing to and clicking on the "+" signs respectively to the left of Queue1 or Queue2) to show its next level of child objects as illustrated by tree view 53 in FIG. 3. These child objects are "Printer1 through Printer4" and "Job1 through Job4". These child objects are also real objects, each respectively associated in the printer control system with a data entity representative of either a particular job waiting to be printed or of a printer in the system. Of course details of the attributes of any of the particular printers or jobs may be selectably shown in region 52 as previously described.

Figure 4:
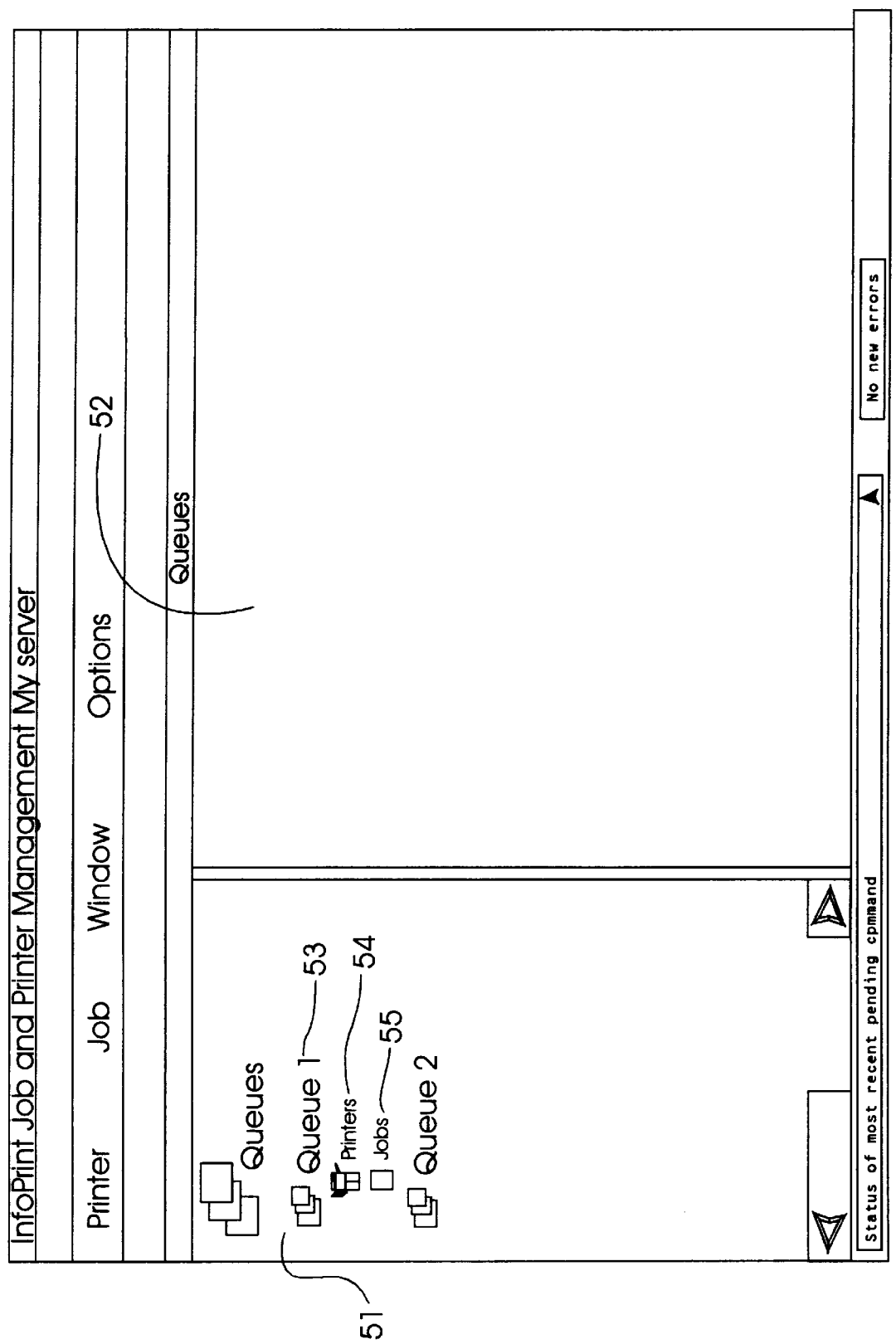
FIG. 4 is the view of the display screen of FIG. 2 showing the creation of virtual child objects of the same queue object selected in FIG. 3.
Figure 5:
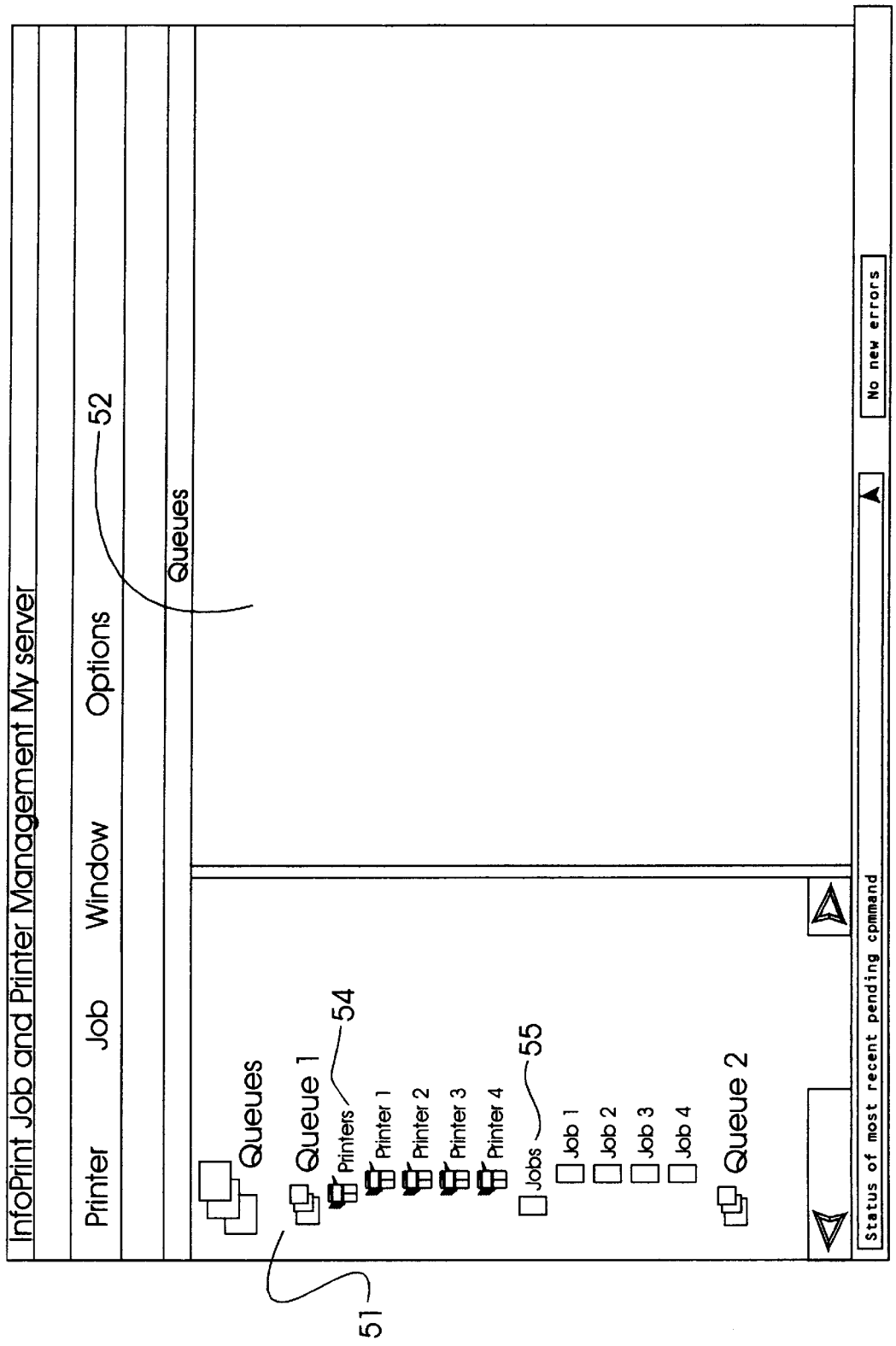
FIG. 5 is the view of the display screen of FIG. 4 after each of the virtual child objects have been expanded to show their respective child objects.

With respect to the illustrative example, we wish to show how a need for a virtual object arose and how such an object solved an organizational problem. A special organizational need arose. Queue1 has a "mixed bag" of several printers and several jobs, where Queue1 contains the jobs which are to be fed to the printers. In order to provide the interactive user with an interface to carry out this organizational procedure, which is compatible with the overall hierarchical tree interface, the user is provided with the screen interface shown in FIG. 4 which has virtual objects "Printers" 54 and "Jobs" 55; both are integrated into the tree 51 as child objects of Queue1 which, as previously noted, is a real object. Virtual objects Printers 54 and Jobs 55 are not associated with any data entities in the overall printer control system being represented by the tree; they can not be selected for a detail view of their own attributes in region 52 since they have no attributes. These virtual objects merely serve the procedural function, as illustrated in FIG. 5, of providing the user with an organized interface in which all of Printer1 through Printer4's (real objects) are neatly organized as child objects of virtual object, Printers 54, and all of the Job1 through Job4's (real objects) are neatly organized as child objects of virtual object, Jobs 55. Such an arrangement makes it easier for the user to examine his overall printers and jobs and get further details of the printer or job child objects in region 52.

For simplicity and clarity in illustration, the size of the trees and various levels of the trees have been reduced to a relatively small number of nodes. However, it should be noted that tree interfaces will frequently be much larger and complex and it is in such complex tree arrangements that having the ability to set up virtual objects for particular procedural purposes would be especially advantageous. From the above example, it should be clear that virtual objects may have child objects that are real objects and such virtual objects may have parent objects which are real objects.

Figure 6:
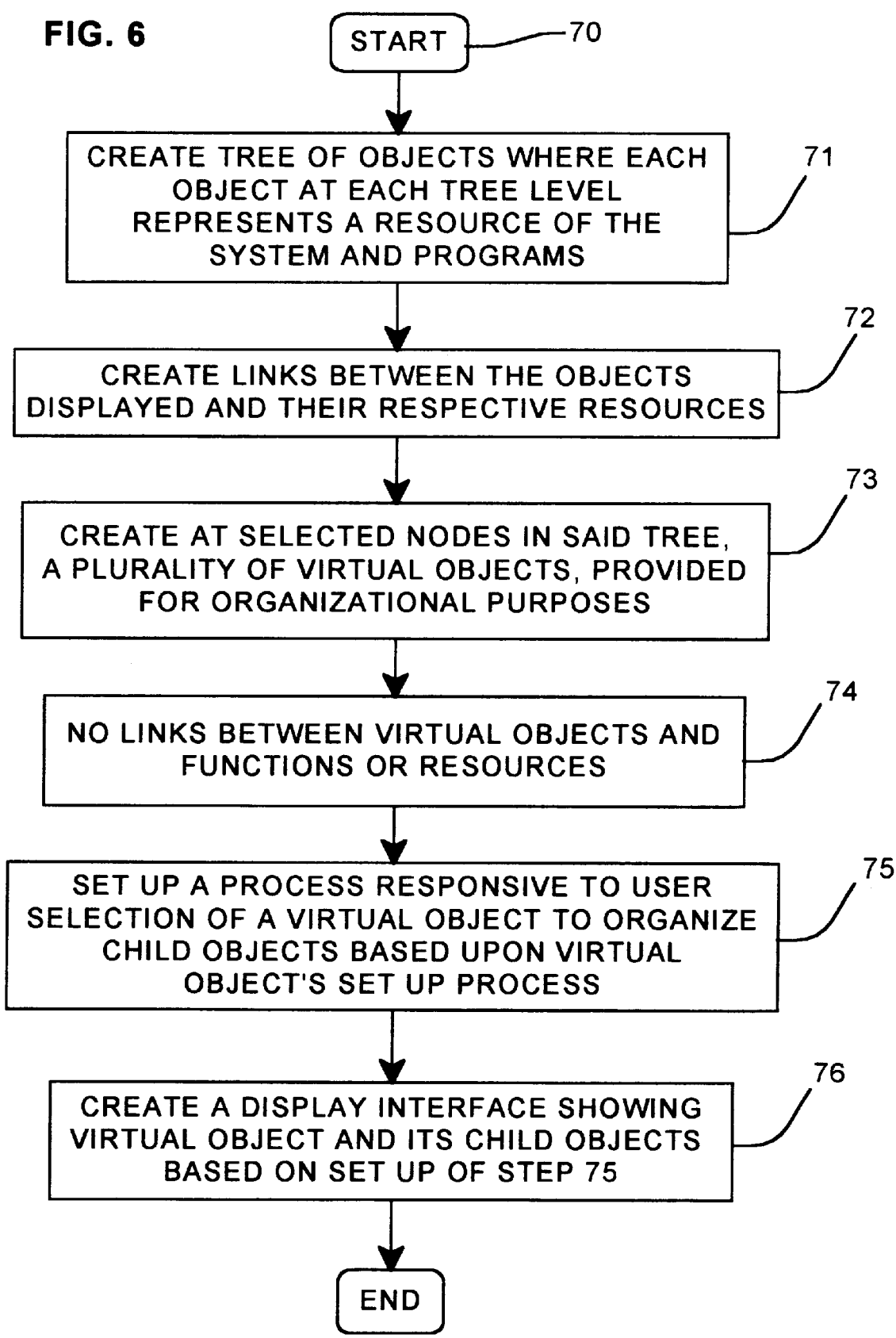
FIG. 6 is a flowchart showing the development of the program of the present invention for creating and inserting virtual objects in hierarchical tree display interfaces.

Now with reference to FIG. 6, we will describe a process implemented by a program according to the present invention. The program is continuous and involves the development of the display screen interfaces previously described with respect to FIGS. 2 through 5. In the flowchart of FIG. 6, a basic window interface is set up, step 71, whereby the operator may control printer functions through a series of queues, arranged in a hierarchical tree, e.g. an interface like that of FIG. 2. Of course, appropriate conventional linkages are set up between representations of functions displayed on a screen whether these representations be text or icons representative of the functions or the functions themselves, step 72, i.e. the data entities in the system which will provide the functions and control the represented resources. Then, step 73, there is created at selected nodes in the tree, a plurality of virtual objects, the purpose of which is to provide the user with an interface compatible with the tree for carrying out organizational or other procedures unrelated to the hierarchy represented by the tree. The Printers 54 and Jobs 55 virtual objects in FIG. 4 are illustrative of such virtual objects. It should be noted that while in the present embodiment, the particular needs for and the creation of virtual objects at points in the tree have been predetermined by the designers of the program, it is within the purview of the present invention for the program to provide the users with the ability to create virtual objects within the tree for limited procedural purposes.

In any event, condition 74, FIG. 6, no links are needed between the displayed virtual objects and resources or functions controlled by the tree hierarchy since there are no data entities represented by such virtual objects. Next, step 75, a process should be set up for presenting to the user a suitable interface responsive to the selection of a virtual object so that the user may conduct the organization procedure for which the virtual object was set up. Then, the interface set up in step 75 is presented to the user, step 76. In the illustrative embodiment, this is the interface of FIG. 5. At this point, the set up of the program according to this invention is completed.

Now that the basic program has been described and illustrated, there will be described with respect to FIG. 7 a flow of a simple operation showing how the program could be run. First, step 80, a tree view, a portion of which is shown in the displays of FIGS. 2 and 4, is set up. Next, an initial determination is made as to whether an object in the tree has been selected, step 81. If No, then a determination is made, step 82, as to whether the session is over. Then, if No, the flow is returned to step 81 and the selection of an object is awaited. When an object is selected and the decision from step 81 is Yes, then a determination is made, step 83, as to whether the object is a virtual object. If the selected object is not virtual but a real object, then appropriate interfaces are provided to the user, step 84, whereby the objects which the user is dealing with are linked to data entities and the user may complete the hierarchical function, step 86, and the flow is then returned to step 81 to await the selection of the next object. If, step 83, the selected object is a virtual object, then an interface like that of FIG. 5 is provided whereby the organizational procedure for which the virtual object was set up is carried out, step 85, without affecting the tree hierarchy. This, for example, would be the allocation of jobs to queues described with respect to FIG. 5.

The virtual objects of the present invention may be effectively used in tree structure of copending U.S. Patent Application: "Data Processor Controlled Display With a Tree of Items With Modification of Child Item Properties Designated at Parent Level Without Modification of Parent Item Properties", C. Alimpich et al., filed on the same date as the present application (U.S. Ser. No. 09/053,211) which is cross-referenced above. This copending application covers tree structures of items where modifications of child item properties may be designated at their parent item but without any modification of parent item properties. If the virtual objects of the present invention were used as parent items in the system of said copending application, then the properties of the virtual object could not be modified since the virtual object had no properties which could be modified.

While the embodiment described has been for a hierarchical tree used in the control of resources in a printing environment, it should be understood that the invention is applicable in any data processing environment or data processor controlled system in which hierarchical trees may be used. This includes all current windows systems such as Microsoft Windows 95™, Windows NT™, IBM OS/2™, as well as Unix and AIX based systems. In general, trees are now used in all areas where resources are managed, e.g. production control, database management and management of data processing resources, including parallel processing, directories, files, etc., and the present invention may advantageously used in all such areas.

In addition, it has been mentioned hereinabove that the present invention may be advantageously used in object oriented programming systems where hierarchical trees are extensively used. By way of background with respect to object oriented programming, its techniques involve the definition, creation, use and instruction of "objects". These objects are software entities comprising data elements or attributes and methods, which manipulate the data elements. The data and related methods are treated by the software as an entity and can be created, used and deleted as such. The data and functions enable objects to model their real world equivalent entity in terms of its attributes, which can be presented by the data elements and its behavior which can be represented by its methods. Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. A significant property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form. The creation of a new subclass borrowing the functionality of another class allows software developers to easily customize existing code to meet their particular needs.

In order to help object oriented program developers construct programs and to make object oriented programs easier to use, object oriented programming systems make extensive use of hierarchical trees in order to help the interactive programmers and users in the understanding of the basic structures of classes and subclasses. The virtual objects of the present invention should provide a very valuable tool to designers and users of object oriented programs and particularly to the trees used to interface with such programs. It will allow users and designers to still use the object oriented tree interfaces to carry out procedures involving the objects in nonhierarchical relationships.

Although certain preferred embodiments have been shown and described, it will be understood that many changes and modifications may be made therein without departing from the scope and intent of the appended claims.

What is claimed is:

1. A data processor controlled user interactive display interface comprising a tree view having:

a plurality of selectable elements arranged in a hierarchy, each of said elements capable of being associated with a plurality of data entities;

at least one virtual element associated with a selectable element, wherein each virtual element does not have an associated data entity, and wherein each virtual element of one selectable element provides an organized interface of the data entities associated with the selectable element.

2. The display interface of claim 1 wherein said virtual element has child elements respectively associated with data entities.

3. The display interface of claim 1 wherein said interface is for the interactive control of production operations.

4. The display interface of claim 3 wherein said production operations are printing operations.

5. The display interface of claim 1, wherein the data entities of one selectable element comprise one of processes executing in a computer system and resources available in the computer system associated with the selectable element.

6. A data processor controlled user interactive display interface comprising a tree view having:

a plurality of selectable objects arranged in a hierarchy, each of said objects capable of being associated with a plurality of data entities;

at least one of said objects having a plurality of virtual child objects, each of said virtual objects associated with a selectable element, wherein each virtual object does not have an associated data entity, and wherein each virtual object of one selectable object provides an organized interface of the data entities associated with the selectable object.

7. The display interface of claim 6 wherein at least one of said virtual child objects has child objects respectively associated with data entities.

8. The display interface of claim 6, wherein said virtual child objects are receptively of types based upon non-hierarchical properties of the data entities to which the virtual child object provides an organized interface.

9. The display interface of claim 6, wherein the data entities of one selectable element comprise one of processes executing in a computer system and resources available in the computer system associated with the selectable element.

10. A method for interactively interfacing with a data processor controlled display interface comprising:

providing a tree view of a plurality of selectable elements arranged in a hierarchy, each of said elements capable of being associated with a plurality of data entities, providing at least one virtual element associated with a selectable element, wherein each virtual element does not have an associated data entity, wherein each virtual element of one selectable elements provides an organized interface of the data entities associated with the selectable element in said tree view.

11. The method of claim 10 wherein said virtual element has child elements respectively associated with data entities.

12. The method of claim 10 wherein said interface is for the interactive control of production operations.

13. The method of claim 12 wherein said production operations are printing operations.

14. The method of claim 10, wherein the data entities of one selectable element comprise one of processes executing in a computer system and resources available in the computer system associated with the selectable element.

15. A method for interactively interfacing with a data processor controlled display interface comprising:

providing a tree view of a plurality of selectable objects arranged in a hierarchy, each of said objects capable of being associated with a plurality of data entities;

providing at least one selectable object in said tree view having a plurality of virtual child objects, each of said virtual child objects associated with a selectable element, wherein each virtual child object does not have an associated data entity, and wherein each virtual child object of one selectable object provides an organized interface of the data entities associated with the selectable object.

16. The method of claim 15 wherein at least one of said virtual child objects has child objects respectively associated with data entities.

17. The method of claim 15, wherein said virtual child objects are respectively of types based upon non-hierarchical properties of the data entities to which the virtual child object provides an organized interface.

18. The method of claim 15, wherein the data entities of one selectable element comprise one of processes executing in a computer system and resources available in the computer system associated with the selectable element.

19. A computer controlled display program having program code included on a computer readable medium for a user interactive interface to a computer controlled display comprising a tree view having:

a plurality of selectable elements arranged in a hierarchy, each of said elements capable of being associated with a plurality of data entities;

at least one virtual element associated with a selectable element, wherein each virtual element does not have an associated data entity, wherein each virtual element of one selectable element provides an organized interface of the data entities associated with the selectable element.

20. The program of claim 19 wherein said virtual element has child elements respectively associated with data entities.

21. The program of claim 19 wherein said interface is for the interactive control of production operations.

22. The program of claim 21 wherein said production operations are printing operations.

23. The program of claim 19, wherein the data entities of one selectable element comprise one of processes executing in a computer system and resources available in the computer system associated with the selectable element.

24. A computer controlled display program having program code included on a computer readable medium for a user interactive interface to a computer controlled display comprising a tree view having:

a plurality of selectable objects arranged in a hierarchy, each of said objects capable of being associated with a plurality of data entities;

at least one of said selectable objects having a plurality of virtual child objects, each of said virtual child objects associated with a selectable element, wherein each virtual object does not have an associated data entity, and wherein each virtual object of one selectable object provides an organized interface of the data entities associated with the selectable object.

25. The program of claim 24 wherein at least one of said virtual child objects has child objects respectively associated with data entities.

26. The program of claim 24, wherein said virtual child objects are respectively of types based upon non-hierarchical properties of the data entities to which the virtual object provides an organized interface.

27. The program of claim 24, wherein the data entities of one selectable element comprise one of processes executing in a computer system and resources available in the computer system associated with the selectable element.

28. In a data processor controlled user interactive display interface comprising a tree view of a plurality of selectable elements arranged in a hierarchy, each of said elements capable of being associated with a plurality of data entities, a structure for enhancing the organization of said tree view comprising:

at least one virtual element associated with a selectable element, wherein each virtual element does not have an associated data entity, and wherein each virtual element of one selectable elements provides an organized interface of the data entities associated with the selectable element.

29. The display interface of claim 28 wherein said virtual element has a parent element associated with a data entity and at least one child element associated with a data entity.

30. The display interface of claim 28, wherein the data entities of one selectable element comprise one of processes executing in a computer system and resources available in the computer system associated with the selectable element.

31. In a method for interactively interfacing with a data processor controlled user interactive display comprising providing a tree view of a plurality of selectable elements arranged in a hierarchy, each of said elements capable of being associated with a plurality of data entities, a method for enhancing the organization of said tree view comprising:

providing at least one virtual element associated with a selectable element, wherein each virtual element does not have an associated data entity, and wherein each virtual element of one selectable elements provides an organized interface of the data entities associated with the selectable element.

32. The method of claim 31 wherein said virtual element has a parent element associated with a data entity and at least one child element associated with a data entity.

33. The method of claim 31, wherein the data entities of one selectable element comprise one of processes executing in a computer system and resources available in the computer system associated with the selectable element.

* * * * *